(12) United States Patent
Hoeksel et al.

(10) Patent No.: US 8,594,668 B2
(45) Date of Patent: Nov. 26, 2013

(54) REGISTERING A MOBILE DEVICE IN A MOBILE COMMUNICATION NETWORK

(75) Inventors: Sebastiaan Hoeksel, Maastricht (NL); Robert van Muijen, As (BE); Patrick H. Waters, Redlynch Salisbury (GB)

(73) Assignee: Vodafone Holding GmbH, Dusseldorf (DE)

( * ) Notice: Subject to any disclaimer, the term of this patent is extended or adjusted under 35 U.S.C. 154(b) by 387 days.

(21) Appl. No.: 12/790,438

(22) Filed: May 28, 2010

(65) Prior Publication Data

US 2010/0304716 A1  Dec. 2, 2010

(30) Foreign Application Priority Data

Jun. 2, 2009 (EP) .................................. 09007301

(51) Int. Cl.
*H04W 4/00* (2009.01)
(52) U.S. Cl.
USPC ..... 455/435.1; 455/406; 455/407; 455/432.3; 455/411; 455/410
(58) Field of Classification Search
USPC .............. 455/411, 410, 558, 406, 407, 432.3, 455/435.1
See application file for complete search history.

(56) References Cited

U.S. PATENT DOCUMENTS

| | | | |
|---|---|---|---|
| 2005/0054329 A1* | 3/2005 | Kokudo | 455/411 |
| 2009/0036126 A1* | 2/2009 | Morikuni et al. | 455/435.2 |
| 2009/0198618 A1* | 8/2009 | Chan et al. | 705/66 |
| 2009/0307142 A1* | 12/2009 | Mardikar | 705/72 |
| 2010/0191370 A1* | 7/2010 | Barragan Trevino et al. | 700/244 |
| 2011/0136482 A1* | 6/2011 | Kaliner | 455/418 |

* cited by examiner

*Primary Examiner* — Khalid Shaheed
(74) *Attorney, Agent, or Firm* — International IP Law Group, PLLC

(57) ABSTRACT

Exemplary embodiments of the present invention relate to a method for registering a first mobile device in a mobile communication network. The exemplary method comprises: (i) authenticating a second mobile device in the mobile communication network upon accessing the mobile communication network, (ii) determining a subscription associated with the second mobile device, (iii) registering the first mobile device in the mobile communication network under a new subscription derived from the determined subscription, and (iv) the first mobile device accessing the mobile communication network in response to a preceding communication between the first and the second mobile device. Furthermore, an exemplary embodiment of the invention relates to a system for carrying out the method.

16 Claims, 2 Drawing Sheets

REGISTERING A MOBILE DEVICE IN A MOBILE COMMUNICATION NETWORK

CROSS REFERENCE TO RELATED APPLICATION

This application claims priority to European (EP) Patent Application No. 09 007 301.6, filed on Jun. 2, 2009, the contents of which are incorporated by reference as if set forth in their entirety herein.

BACKGROUND

The term machine-to-machine technology or the alternative terms man-to-machine, machine-to-man, machine-to-mobile and mobile-to-machine technology, which are all abbreviated as M2M technology, generally refer to data communications from/to machines. In particular, the M2M technology allows for accessing objects or functionalities of objects from a remote location. Typically, the M2M technology is used for collecting information, sending indications of unusual situations, and setting parameters or otherwise controlling devices from remote locations. For this purpose M2M devices comprising suitable sensors or actors may be attached to the object which is monitored or controlled. One example is an M2M device or tag that is attached to a container and signals the location of the container or other measured parameters to a remote location. One possibility to connect an M2M device and the remote location is to set up a connection via a mobile communication network.

Access to a mobile communication network is usually limited to registered subscribers. The subscription represents an association between a communication device and a customer of a mobile network operator of the mobile communication network. The subscription ensures that the mobile network operator can charge the customer for usage of the services of the mobile communication network. In addition, a subscription enables the mobile network operator to authorize the customer to access services or data related to the device. In this case the customer may authenticate with the mobile network using a mobile network authentication or any other accepted authentication scheme (e.g. username/password). In order to allow access to services of the mobile communication network communication devices are authenticated when accessing the mobile communication network.

Authentication is done using identification and authentication data which is sent between the communication device and an authentication server of the mobile communication network that grants access to the services of the mobile communication network upon successful verification of the identification and authentication data. In the communication device, the identification and authentication data are usually stored in an identification module in a secure way. For instance, in GSM networks (GSM: Global System for Mobile Communications) the identification module is configured as SIM (SIM: Subscriber Identification Module) according to the GSM standard and in UMTS networks (UMTS: Universal Mobile Telecommunications System) the identification module is configured as a USIM (USIM: Universal Subscriber Identification Module). The identification and authentication data are usually uniquely assigned to an identification module, and they are stored in the identification module by the manufacturer or vendor of the identification module or the mobile network operator issuing the identification module. Since at least the authentication data are sensitive and must kept secret from unauthorized third parties, storing the authentication data requires high security standards is therefore relatively complex.

For registering a communication device in the mobile communication network under a subscription, it is necessary for the mobile network operator to have knowledge of the user of the identification module or communication device. Usually, the subscription is generated at the time of purchase of the identification module or communication device. Therefore, the distribution and purchase of identification modules is complex and costly for the mobile network operator and the buyer of a communication device. This is disadvantageous for M2M devices, since it would be favourable to be able to distribute M2M devices as cost-efficient as possible. Furthermore, it would be advantageous for a user of an M2M device when the M2M device would be associated to a subscription only at the time of use that may be considerably later than the time of purchase of the M2M device. In particular, this would prevent the user of the M2M device from being charged for a subscription of the M2M device to the mobile communication network before the M2M device is used.

SUMMARY

Exemplary embodiments of the present invention relate to a method and a system for registering a mobile device in a mobile communication network. An exemplary embodiment generally relates to the registration of any mobile communication device in a mobile communication network. In particular, the mobile communication device may be an M2M device.

Therefore, an exemplary embodiment of the present invention may provide for registering an M2M device under a subscription in a mobile communication network as close as possible to the time of use of the M2M device.

An exemplary method for registering a first mobile device in a mobile communication network is suggested. The exemplary method comprises:
   authenticating a second mobile device in the mobile communication network upon accessing the mobile communication network,
   determining a subscription associated with the second mobile device,
   registering the first mobile device in the mobile communication network under a new subscription derived from the determined subscription, and
   the first mobile device accessing the mobile communication network in response to a preceding communication between the first and the second mobile device.

According to an exemplary embodiment of the invention, a system for registering a first mobile device in a mobile communication network is suggested. In the system, a second mobile device can be authenticated in an authentication server of the mobile communication network, the authentication server being configured to determine a subscription associated with the second mobile device and to register the first mobile device in the mobile communication network under a new subscription derived from the determined subscription. The first mobile device and the second device can communicate with each other, an access of the first mobile device to the mobile communication being allowed in response to a preceding communication between the first and the second mobile device.

An exemplary embodiment involves the idea to register a first mobile device in a mobile communication network under a new subscription using a second mobile device, which can be authenticated in the mobile communication network and to which a valid subscription is associated. The new subscription is derived from the subscription of the second mobile device. In particular, the new subscription may be an association between the user of the second mobile device and the first mobile device. The first mobile device can access the mobile communication network upon a local communication between the first and the second mobile device. Thus, an exemplary embodiment of the invention allows for a simplified registration of a mobile device in the mobile communication network. Only a second mobile device that can be authenticated in the mobile communication network is necessary for carrying out the registration procedure. Thus, a user of the device to identification module or communication device be registered can perform the registration using another mobile device at a time and location of his choice.

In one exemplary embodiment of the method and the system, the first and the second mobile device communicate with each other via a short range radio connection, particularly via an NFC connection (NFC: Near Field Communication). Such a short range radio connection may be established by bringing the first and the second mobile device in close proximity to each other. This simplifies the set up of the connection for the user and ensures that a communication connection is established to the correct first mobile device.

For accessing the mobile communication network, authentication data have to be provided in the first mobile device. In one embodiment of the method and the system, the second mobile device sends authentication data to the first mobile device in the communication between the first and the second mobile device, the first mobile device using the authentication data for accessing the mobile communication network. It is an advantage of this embodiment that authentication data do not have to be stored in the first mobile device before the registration in the mobile communication network is done. Thus, the first mobile device does not have to be personalized beforehand in order to access the mobile communication network.

An exemplary embodiment of the method and the system provides that the authentication data is provided by the second mobile device and that the second mobile device sends the authentication data to the mobile communication network for registration under the new subscription. Here, the authentication data may be generated in the second mobile device or the second mobile device may choose the authentication data from authentication data stored therein before. Advantageously, in this embodiment, authentication data are provided locally by the second mobile device without involving the mobile communication network. A foregoing step for storing the authentication data in the first mobile device can be dispensed with. In order to register the first mobile device under the new subscription, the authentication data are transmitted to the mobile communication network from the second mobile device.

However, the authentication data may likewise be provided by the mobile communication network. Therefore, in a further exemplary embodiment of the method and the system, a mobile communication network transmits the authentication data to the second mobile device and the second mobile device forwards the authentication data to the first mobile device in the communication between the first and the second mobile device. As in the embodiment described before, a foregoing step for storing the authentication data in the first mobile device can be dispensed with Furthermore, in one exemplary embodiment of the method and the system, the mobile communication network notifies the second mobile device of a first network access of the first mobile device and further network accesses of the first mobile device are allowed only in response to a confirmation sent from the second mobile device to the mobile communication network. In particular, this prevents unauthorized third parties to register a mobile communication device using the subscription associated to the second mobile device.

In a further exemplary embodiment of the method and the system, first mobile device is registered under the new subscription in response to an authentication of the first mobile device in the communication network, the authentication being based on further authentication data stored in the first mobile device. The authentication data may not be uniquely assigned to the specific device but to a plurality of devices, in particular to first mobile devices sold together in a batch. The authentication data are used authenticate the first mobile device in the registration process and to verify that that the first mobile device is part of a trusted batch of devices.

Further exemplary embodiments of the method and the system differ from the embodiments described before in that authentication data are already stored in the first mobile device before the first mobile device is registered in the mobile communication network. This allows the first mobile device to access a mobile communication network in the registration procedure and to be authenticated in the mobile communication network before the registration under the subscription.

In one exemplary embodiment of the method and the system, identification data of the first device are transmitted to the second device in the communication between the first and the second mobile device, the second mobile device forwarding the identification data to the mobile communication network and the mobile communication network registering the first mobile device under the new subscription upon identifying the first mobile device using the identification data.

In a related exemplary embodiment of the method and the system, in the mobile communication network authentication data are stored in association to the first mobile device, the authentication data being used to authenticate the first mobile device when it accesses the mobile communication network. Advantageously, the authentication data can be stored in the mobile communication network before the registration process and can be used for authenticating the first mobile device when it accesses the mobile communication network in the registration process and after the registration process.

Preferably, the first mobile device accesses the mobile communication network in response to the communication between the first and the second mobile device and is identified and authenticated in the mobile communication network. This allows the mobile communication network to directly identify the mobile device to be registered and to verify the authenticity of this device.

Further on, in one exemplary embodiment of the method and the system, the mobile communication network sends to the second mobile device a feature of the first device in response to the access of the mobile communication network by the first mobile device, the first mobile device being registered in the mobile communication network only, if the mobile communication network receives a confirmation from the second mobile device as a response to the transmission of the feature. In this embodiment, the user of the second mobile device can confirm to the mobile communication network that the correct first mobile device is being registered.

Preferably, the feature is a visual feature present on the first mobile device allowing a user of the second mobile device to verify the identity of the first mobile device. For instance, the feature may be a registration number, which is also imprinted the housing of the first mobile device.

In one exemplary embodiment of the method and the system, the first mobile device is an M2M device comprising a control module for receiving measuring data from at least one sensor and/or for controlling at least one actuator and a radio module for accessing the device from a remote location via the mobile communication network.

In a further exemplary embodiment of the method and the system, the second mobile device comprises a user interface allowing a user to interact with the second mobile device. In contrast thereto, the first mobile device does not necessarily need to dispose of a user interface, since in the registration process it is accessed via a wireless short range communication interface.

In a further exemplary embodiment of the method and the system, the first and/or the second mobile device comprise an identification module for storing the authentication data used for accessing the mobile communication network. The identification module may be a SIM according to the GSM standard, a USIM according to the UMTS standard or a similar identification module used in a mobile communication network, which is configured according to a different standard.

BRIEF DESCRIPTION OF THE DRAWINGS

Reference will be made by way of example to the accompanying drawings in which.

DETAILED DESCRIPTION OF SPECIFIC EMBODIMENTS

Figure 1:
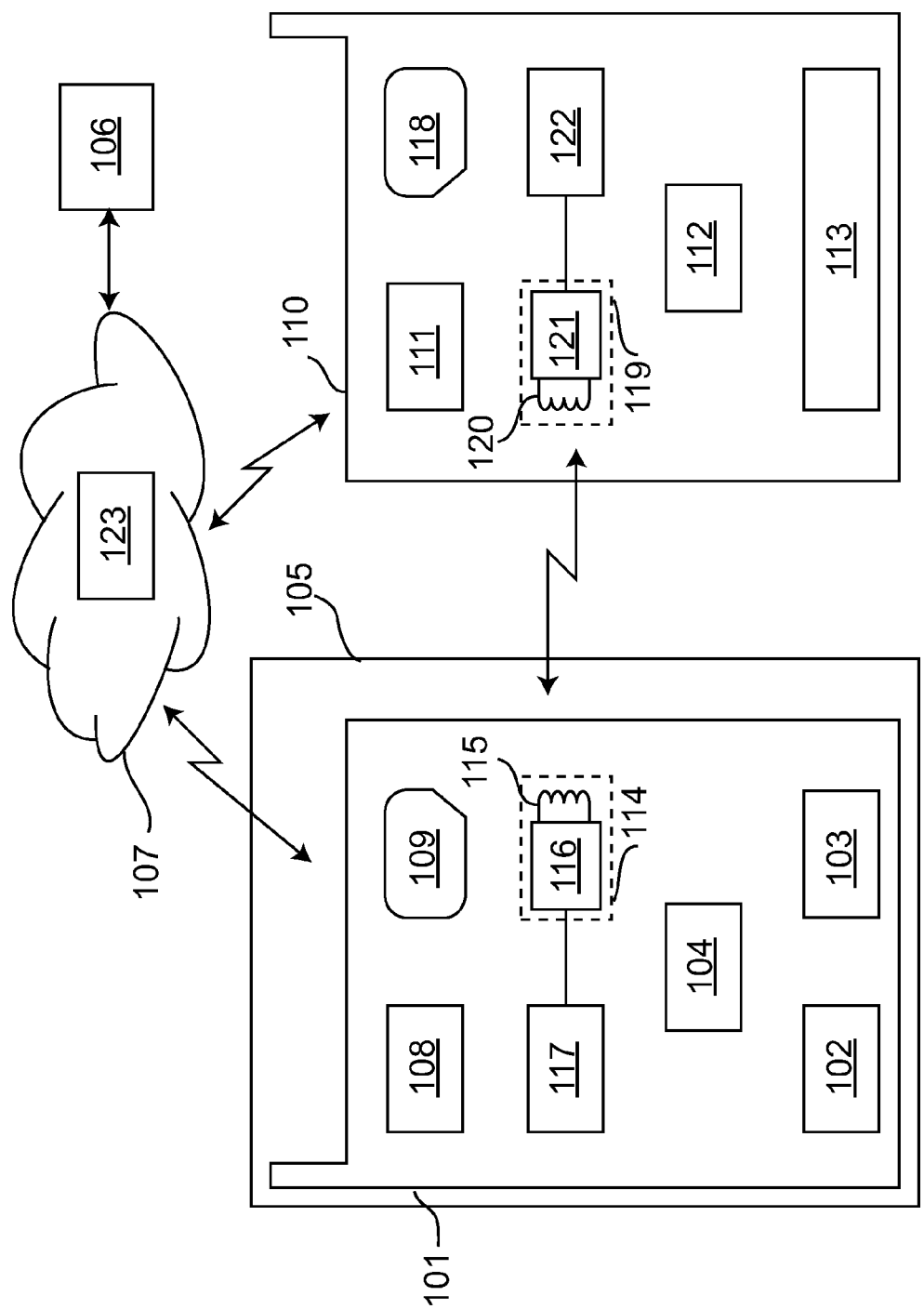
FIG. 1 a block diagram showing an M2M device and a reader unit used in connection with the registration of the M2M device in a mobile communication network, according to an exemplary embodiment of the present invention.

FIG. 1 schematically shows a schematic block diagram of first mobile device 101, which can be connected to a mobile communication network 107. In the depicted embodiment, the first mobile communication device 101 is an M2M device that can be removably or permanently attached to an object 105. Using the M2M device 101, the object 105 can be monitored and/or controlled from a remote location 106 via the mobile communication network 107.

The M2M device 101 comprises a control module 104, which is coupled to at least one sensor 102 and/or at least one actuator 103. The sensor 102 may be integrated into the housing M2M device 101 or the sensor 102 is arranged in a separate housing and electrically connected to the control module 104. In the latter case, the M2M device 101 can be used to access sensors 102, which form a component of the object 105 and sensors 102 which are attached to the object 105 in addition to the M2M device 101. Preferably, the control module 104 can interact with different sensors 102 using different configurations. As the sensor 102, the actuator 103 can be integrated into the housing of the M2M device 101, or it can be an external actuator 103, which is an integral part of the object 105 or of a further device attached to the object 105. Using different configurations, the control module 104 may be able to interact with different external actuators 103.

A sensor 102 coupled to the control module 104 is configured to measure a certain parameter in connection with the object 105 to which the M2M device 101 is attached. In particular, the sensor 102 may be configured to measure a parameter that is related to the operating conditions within or around the object 105, such as temperature, pressure, humidity or the like. Likewise, the sensor 102 may be adapted to monitor the position of the object 105 and may comprise a unit for determining the position of the object 105, such as, for example, a GPS receiver (GPS: Global Positioning System). In this configuration, the M2M device 101 can be used to track and trace the object 105 particularly on a transportation route. In addition or as an alternative, the sensor 102 may be adapted to detect the operating state of certain components of the object 105, such as, for example, the operating state of a lock mechanism, the operating state of a motor or the like.

The optional actuator 103 is adapted to act on the object 105 to which the M2M device 101 is attached or on a component of the object 105. For example, the actuator 103 may comprise a motor or an alternative drive for acting on the object 105. The actuator 103 is controlled by the control module 104 according to a control program, which is stored in the control module 104. The control of the actuator 103 may be based on a fixed procedure. Likewise, the control may be responsive to data measured by one or more sensors 102 in the sense of a closed-loop control.

A connection between the M2M 101 device and the remote location 106 is established via the mobile communication network 107 to which the M2M device 101 can be connected wirelessly. The mobile communication network 107 may be configured according to the GSM or UMTS standard, for example. For accessing to the mobile communication network 107, the M2M device 101 comprises a radio module 108 which provides a radio interface for connecting to the mobile communication network 107 and which is configured according the mobile communication standard on which the mobile communication network 107 is based. The remote location 106 may access the mobile communication network 107 directly or via another network, such as, for example, the Internet, which has a gateway to the mobile communication network 107. The communication between the device 101 and the remote location 106 via the mobile communication network 107 may be based on any bearer service provided in the network. Particularly, a bearer service for non-speech data may be used, such as SMS (Short Message Service), USSD (unstructured supplementary services data), CSD (circuit switched data), HSCSD (high speed circuit switched data) or GPRS (general packet radio system). However, it may likewise be provided to exchange information in the form of speech data using a corresponding bearer service of the mobile communication network 107.

The radio module 108 is coupled to the control module 104, which is likewise connected to the sensor 102 and/or actuator 103 of the M2M device 101. The control module 104 may be configured as a microcontroller comprising a processor for running programs and a memory for storing program code and further data. In order to interact with the sensor 102 and/or actuator 103, the control module 104 may be equipped with an analogue-to-digital converter (ADC) and/or a digital-to-analogue converter (DAC) thereby allowing a data exchange with an analogue sensor 102 or actuator 103. The ADC converts analogue signals received from the sensor 102 or actuator 103 into digital signals before forwarding them to the processor of the control module 104. Similarly, the DAC converts digital signals received from processor into analogue signals that are forwarded to the sensor 102 or actuator 103. In addition or as an alternative, the control module 104 may provide a GPIO interface, for interacting with the sensor 102 and actuator 103 (GPIO: General Purpose Input/Output). Of course, the control module 104 can make use of additional or other interfaces to the sensor 102 and/or actuator 103.

The control module 104 provides application logic to control the sensor 102 and actuator 103 and the communication with the remote location 106. Among other functions, the control module 104 is able to request and receive measuring data from the sensors 102. The measuring data may be forwarded to the remote location 106 via the mobile communication network 107 using the radio module 108 and/or the measuring data may be stored locally in the control module 104. Likewise, the control module 104 may be able to evaluate measuring data received from the sensors 102 and send the result of the evaluation to the remote location 106 and/or store the result locally. For instance, this allows for generating summary data from the sensor signals.

Moreover, the control module 104 is able to send control commands to the sensor 102 and actuator 103 to control their operations. In particular, the control module 104 may be configured to activate and deactivate the sensor 102 or actuator 103 or certain functionalities thereof, to request measuring data from the sensor 102, and to influence operating parameters of the sensor 102 and actuator 103. The control module 104 may operate according to predefined program routines, which are stored in the control module 104. In addition or as an alternative, functions of the control module 104 are invoked upon request from the remote location 106. Such requests are sent to the M2M device 101 via the mobile communication network 107 and received using the radio module 108.

Furthermore, the control module 104 may comprise management data relating to the object 105 to which the M2M device 101 is attached. This data may include a unique identification which may be linked permanently or temporarily to the object 105. In addition, data describing the object 105 may be stored in the control module 104. For example in case the object 105 is a shipping container, these data may describe one or more of the following details: the contents of the container and details relating thereto, the container's weight, the dimensions of the container, the place of origin of the container, the destination of the container, possible interstations, the means of transportation provided for shipping the container, the owner of the container, the sender of the container's contents and the addressee of the contents. Of course, further details may also be stored in the control module 104.

As an alternative to the storage of the management data in the M2M device 101, it may be provided that a database entry comprising the management data is linked to the M2M device 101. The database entry is linked to the M2M device 101 by an identification code assigned to the M2M device 101 and to the database entry. In this embodiment, the control module 104 stores the identification code, which can be used to read the related management data from the database. As an alternative, the aforementioned identification code may be an identification code (e.g. IMSI) stored in an identification module 109 of the M2M device 101 and used for identifying the M2M device 101 or the identification module 109 in the mobile communication network 107, thus removing the need to store an additional identifier in the control module 104. Preferably, the identification is also sent from the control module 104 to the remote location 106 to allow the remote location to identify the object 105 to which the M2M device 101 is attached, when the M2M device 101 communicates with the remote location 106. The database storing the management data may be operated at the remote location 106.

The components of the M2M device 101 are supplied with power by a power supply. The power supply may be a power connector connecting the M2M device 101 to an external power supply circuit. Using the power supply, the M2M device 101 may be connected to a power supply circuit available at the site of operation of the M2M device 101. This may be a power supply circuit of the transportation vehicle transporting the object 105 or it may be a power supply circuit of the object 105, for example. In further embodiments, the power supply is an autarkic power supply of the M2M device 101 and generates power from chemical or mechanical processes. Examples of such power supply are batteries, solar cells or device for generating power from movement of the M2M device 101. Furthermore, the power supply may comprise a battery that may be charged during the operation of the M2M device using energy conversion.

The M2M device 101 is able to communicate with a second mobile device 110, which is referred to as reader unit hereinafter. The reader unit 110 can likewise access the mobile communication network 107 wirelessly. For this purpose, the reader unit 110 comprises a radio module 111, which may be configured similarly to the radio module 108 of the M2M device 101. Functions of the reader unit 110 are controlled by a controller unit 112 to which the radio module 111 is connected. Furthermore, the reader unit 110 comprises a user interface 113, which is likewise connected to the controller unit 112 and which allows an operator to interact with the reader unit 110 and which may include a display unit and an input unit, such as, for example, a keyboard. Preferably, the reader unit 110 comprises a portable handheld device, which can be used by an operator to control a data exchange between the reader unit 110 and the M2M device 101. However, the reader unit 110 may also be configured as a stationary device.

The communication between the M2M device 101 and the reader unit 110 is desirably based on a wireless short range communication technology. In this embodiment, a data connection between the reader unit 110 and the M2M device 101 can be established when the reader unit 110 is brought in proximity of the M2M device 101 or vice versa.

For communicating with the reader unit 110, the M2M device 101 includes a communication module 114. The communication module 114 comprises an antenna 115 and an antenna controller 116. The antenna 115 is used for sending and transmitting data wirelessly and the antenna controller 116 controls the antenna 115 on a physical level. On the application level, a communication application 117 coupled to the communication module 114, particularly to the antenna controller 116, controls the operation of the antenna 115 and the communication module 114. As depicted in FIG. 1, the antenna controller 116 and the communication application 117 may be integrated into a single chip coupled to the antenna 115. However, in further embodiments, the communication application 117 may not be implemented in one chip together with communication module 114. Rather, the communication application 117 may be integrated into an identification module 109 of the M2M device 101, as will be described below. In this case, the identification module 109 is connected to the communication module 114 via an interface allowing a data exchange between the communication application 117 and the communication module 114.

The reader unit 110 likewise includes a communication module 119. The communication module 119 is configured similarly to the communication module 114 of the M2M device 101. In particular, it also comprises an antenna 120 and an antenna controller 121 controlling the antenna 120 on the physical level. Furthermore, the reader unit 110 comprises an application 122 controlling the communication module 119 on the application level. The application 122 may be integrated together with the antenna controller 121 in one single chip or it may be integrated in another component of the reader unit 110. Particularly, the application 122 may be integrated into an identification module 118 of the reader unit 110, which in this case is connected to the communication module 119 via an interface allowing a data exchange between the application 122 and the communication module 119.

In one embodiment, the communication between the M2M device 101 and the reader unit 110 is based on the NFC technology (NFC: Near Field Communication). The NFC technology is specified in ISO 18092 and 21481, ECMA 340.352 and 356, and ETSI TS 502 109 and allows contactless communication over a short distance between several centimetres and several ten centimetres. NFC-enabled devices comprise a magnetic loop antenna operating at a frequency of 13.56 MHz and an NFC controller controlling the antenna on the physical layer. The NFC controller interacts with one or more NFC applications controlling the operation of the NFC-enabled device on the application level. In order to use the NFC technology, the communication modules 114, 119 of the M2M device 101 and the reader unit 110 are configured accordingly. The communication application 117 and the application 122 are configured as NFC applications in this embodiment. As described before, one or both of the identification modules 109, 118 may provide the option to install NFC applications and to interact with an NFC controller. In particular, the Single Wire Protocol (SWP) has been developed for this purpose and may be used to connect the identification module 109, 118 and the corresponding communication module 114, 119, when the NFC application is hosted in the identification module 109, 118.

The NFC technology provides different communication modes, which correspond to different tag types defined in the NFC specifications and which differ in the communication protocols used and in the data transmission rates, for example. Type 1 and type 2 tags are based on the specification ISO 14443 type A, type 3 tags use the specification ISO 18092 and type 4 tags are compatible to the specifications ISO 14443 type A and type B. Furthermore, NFC-enabled devices can communication in an active and in a passive communication mode. In the active communication mode each of the communicating devices generates a high frequency field at the carrier frequency in order to send data to the communication partner. In the passive communication mode only one communication partner, which is called initiator, generates a high frequency field at the carrier frequency that is used by the initiator to transmit data to the other communication partner which is called target. The target uses load modulation for transmitting data to the initiator. This means that the current through the antenna of the target is modulated using a controllable resistor. In different embodiments, the M2M device 101 and the reader unit 110 may both be operated in the active communication mode or one device may take the role of the initiator and the other device may be operated as the target.

For accessing the mobile communication network 107, identification data are sent to an authentication server 123 of the mobile communication network 107. Using these data, the authentication server 123 identifies the device. Identification data of a device may comprise an identification string, which is uniquely allocated to the device and stored in the authentication server 123. Furthermore, a device accessing the mobile communication network 107 is authenticated in the authentication server 123. This is done using authentication data securely stored the device. The authentication data may include a secret cryptographic key. A corresponding key is stored in the authentication server 123 and both keys may form a symmetric or an asymmetric key pair. For authenticating a device, the authentication server generates a challenge, which is answered by the device. In the device, the answer to the challenge is generated using the authentication data, and in the authentication server the answer is verified using the corresponding data stored in the authentication server 123 in association to the device. Here, identification particularly refers to the process of determining the identity of an entity and authentication refers to verifying the determined identity. The identification and authenticating of the device are parts of a check, whether the device is authorized to use services of the mobile communication network 107. Access to the mobile communication network 107 is granted only, when the authorization check is successful. The identification and authentication data may be generated and issued by the operator of the mobile communication network 107 or with permission of the mobile network operator.

Usually, the authorization of a device to access the mobile communication network 107 is based on a subscription with the mobile network operator. The subscription relates to the user or owner of the device and is the basis for charging the use of services of the mobile communication network 107. In particular, the subscription includes an association between a device and its user.

In the M2M device 101 and in the reader unit 110, the identification and authentication data are stored in the identification modules 109, 118. In addition to the identification and authentication data, the identification modules 109, 118 comprise applications, which particularly provide functionalities and communication protocols for communicating with the authentication server 123 in the authentication procedure. While the identification and authentication data may be uniquely associated to an identification module 109, 118, the application is generic and used in each identification module 109, 118 of the same type. As it is usually the case in mobile communications, the identification modules 109, 118 may be provided on smartcards. The smartcards are removably connected to the corresponding device. Particularly such a smartcard can be inserted into a card reader unit 110 of the M2M device 101 and/or the reader unit 110. The configuration of the identification modules 109, 118 corresponds to the type of the mobile communication network 107. In particular, if the mobile communication network 107 is a GSM network, the identification modules 109, 118 are configured as SIMs according to the GSM standard. If the mobile communication network 107 is a UMTS network, the Smartcards are configured as UICCs (Universal Integrated Circuit Cards) each comprising a USIM application providing the identification and/or authentication data. Of course, other form factors can also be used to provide a SIM, USIM or further identification modules, such as, for example, a VQFN8 chip form factor. The identification module may 109 also be hosted in a form factor soldered into the M2M device 101. Alternatively, the identification module 109 may be hosted in a secured memory space of the M2M device 101, particularly of the control module 104.

When the identification module 109 is fixedly included in the M2M device 101, the conventional purchase processes is more complicated, because the purchaser of the M2M device 101 needs to register with the mobile network operator as it is assumed that he is also the customer for the subscription. Also the lifecycles of the M2M device 101 and identification module 101 are dependent in a much earlier stage than with removable identification. Therefore, it is especially advantageous to register the M2M device 101 in the mobile communication network 107, when the identification module 109 is fixedly included in the M2M device 101.

The reader unit 110 or the identification module 118 of the reader unit 110 is registered in the mobile communication network 107 under an existing subscription. This may be a subscription of the owner or user of the reader unit 110 and the M2M device 101, which may be a company using the M2M device 101, for example. Due to the registration, the reader unit 110 can access the mobile communication network 107 and services thereof. In contrast thereto, the M2M device 101 initially is not registered in the mobile communication network 107 under a subscription. Rather, an association to a subscription is done if required. This may be the case, when the M2M device 101 is going to be used and to be attached to the object 105. For the user of the M2M device 101 this has the advantage that mobile services are charged only after the registration of the M2M device 101 immediately before its use. Particularly, when the user disposes of a plurality of M2M devices 101 this leads to a high cost efficiency. Moreover, the registration of the M2M device is simplified.

The registration of the M2M device 101 under the subscription is done using the reader unit 110. Preferably, the M2M device 101 is registered under a subscription derived from the subscription of the reader unit 110. In particular, the new subscription may include an association of the user of the reader unit 110 and the M2M device. The M2M device 101 may be registered under the subscription when it is set up for use with the object 105. If the object 105 is a container to be monitored using the M2M device 101, the registration may be done, when the container is prepared for shipping, for example.

In one embodiment, the identification module 109 of the M2M device 101 is issued having identification and authentication data stored therein. These data may be generated and stored in the identification module 109 by the mobile network operator issuing the identification module 109 or by the manufacturer or vendor of the identification module 109. The identification and authentication data are also stored in the authentication server 123. Thus, the authentication server 123 is capable of identifying and authenticating the identification module 109. However, the identification module 109 is not associated with a subscription in the mobile communication network 107 when it is issued. Hence, it is not capable of accessing services of the mobile communication network 107 other than the services required for the registration process described hereinafter.

For associating the M2M device 101 with a subscription in the mobile communication network 107, the reader unit 110 accesses the mobile communication network 107. Thereupon, the reader unit 110 is identified and authenticated in the authentication server 123. Furthermore, in the authentication server 123, the subscription to which the reader unit 110 is associated is determined using the identification data of the reader unit 110. Preferably, from this subscription the subscription, to which the M2M device 101 will be associated, is derived.

In addition, the reader unit 110 establishes a local communication connection to the M2M device 101. As described before, this connection is a short range wireless connection, particularly an NFC connection. Via this connection, the M2M device 101 transmits identification data to the reader unit 110 upon request of the reader unit 110. The reader unit 110 forwards these identification data to the authentication server 123 in order to identify the M2M device 101 which is to be registered in the mobile communication network 107 under the subscription. The identification data may be those identification data stored in the identification module 109 of the M2M device 101. However, it is likewise possible that further identification data are transmitted from the M2M device 101 to the reader unit 110. These further identification data are also stored in the authentication server 123 in association to the specific M2M device 101 so that the authentication server 123 is capable of identifying the M2M device 101 using the identification data received from the reader unit 110.

Preferably, the M2M device 101 also accesses the mobile communication network 107 in response to the communication with the reader unit 110. When it accesses the mobile communication network 107, the M2M device 101 is identified and authenticated in the authentication server 123 using the identification and authentication data stored in the identification module 109 of the M2M device 101. Then, the authentication server 123 may check whether the device that accesses the mobile communication network 107 corresponds to the M2M device 101, which has been announced for registration by the reader unit 110. Optionally, the reader unit 110 also sends identification data to the M2M device 101, which are forwarded by the M2M device 101 to the authentication server 123. Using these identification data, the authentication server 123 identifies the reader unit 110 that accessed the M2M device 101 and checks whether the same reader unit 110 requested the registration of the M2M device 101. The identification data sent from the reader unit 110 to the M2M device 101 and forwarded to the authentication server 123 may again be the identification data stored in the identification module 118 of the reader unit 110, or it may be further identification data which are also stored in the authentication server 123 in association to the specific reader unit 110.

After the M2M device 101 and the subscription have been identified in the authentication server 123 and after the aforementioned checks have been made successfully, the authentication server 123 registers the M2M device 101 or its identification module 109 in the mobile communication network 107 under a derived subscription, linking the user of the reader unit 110 and he M2M device 101. This involves allocating the identification and authentication data of the identification module 109 stored in the authentication server 123 to the subscription to which the identification module 109 is to be associated. When the M2M device 101 accesses the mobile communication network 107 after its registration, the authentication server 123 recognizes the subscription and grants the M2M device 101 access to services of the mobile communication network 107.

One implementation of the registration process described before is schematically depicted in FIG. 2. In a first step 201, the reader unit 110 accesses the communication network 107 and is identified and authenticated in the authentication server 123. Then, the reader unit 110 is operated to establish a local communication connection with the M2M device 101. This may be done by bringing the reader unit 110 and the M2M device 101 in close proximity to each other so that a wireless short range communication connection is established. Using the established connection, the reader unit 110 sends identification data to the M2M device 101 in step 202. Upon receipt of the identification data the M2M device 101 transmits data identifying the M2M device 101 to the reader unit 110 in step 203. As described before, the identification data exchanged between the M2M device 101 and the reader unit 110 may be the identification data stored in the identification module 109, 118 of the respective device 101, 110 or it may be further identification data, which are also stored in the authentication server 123.

Furthermore, the M2M device 101 accesses the mobile communication network 107 and is authenticated in the authentication server 123 in step 204. Then, each device 101, 110 transmits the identification data received from the other device 101, 110 to the authentication server 123. Particularly, the M2M device 101 sends the identification data received from the reader unit 110 to the authentication server 123 in step 205 and the reader unit 110 transmits the identification data received from the M2M device 101 to the authentication server 123 in step 206. The authentication server 123 may verify the identification data of both devices 101, 110 and may then register the M2M device 101 in the mobile communication network 107 under the new subscription derived from the subscription of the reader unit 110 after having successfully verified the identification data.

Figure 2:
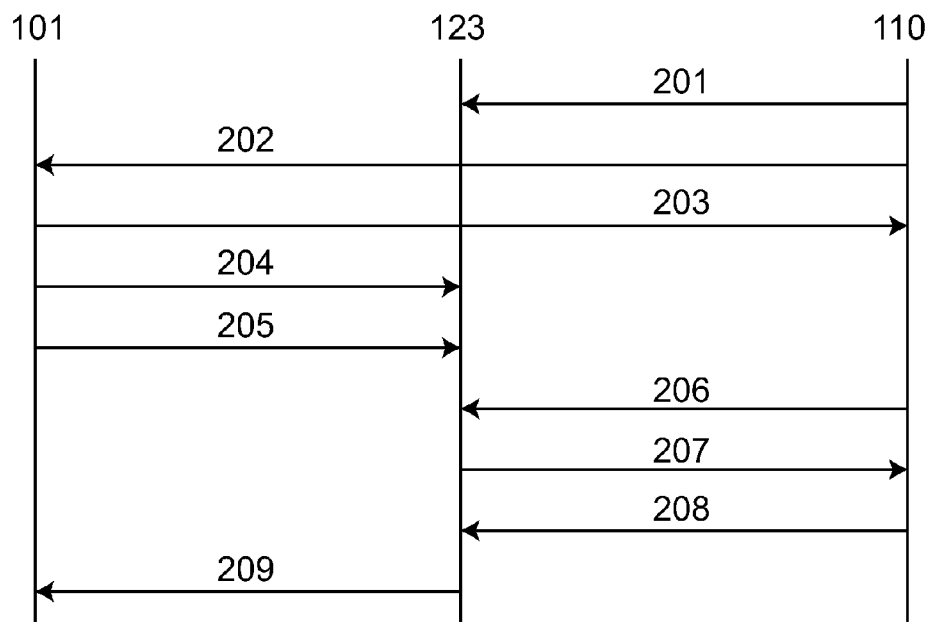
FIG. 2 is a schematic diagram showing the process of registering the M2M device in the mobile communication network, according to an exemplary embodiment of the present invention.

However, in the embodiment depicted in FIG. 2, the authentication server 123 additionally sends data to the reader unit 110 which allow the user of the reader unit 110 to visually verify the identity of the M2M device 101 in step 207. For example, these data may comprise a registration number of the M2M device 101 which is also imprinted on a housing of the M2M device 101. The authentication server 123 determines the data using the identification data of the M2M device 101 which have been sent by the M2M device, when it has accessed the mobile communication network 107. The operator of the reader unit 110 compares the received data with the data present on the M2M 101, and if the operator determines an agreement of the data, the operator may actuate activate the reader unit 110 to send a confirmation of the registration of the M2M device 101 to the authentication server 123 in step 208. Upon receipt of the confirmation, the authentication server 123 registers the M2M device 101 in the mobile communication network 107 under the given subscription.

Preferably, the authentication server 123 notifies the M2M device 101 of the registration in step 209. When the M2M device 101 receives the notification it may change its internal state so that it no longer accepts commands other than those from the reader unit 110 that identified itself towards the M2M device 101. This ensures that no further registration process can be carried out after the M2M device 101 has been registered in the mobile communication network 107 once.

In a further embodiment, the identification module 109 of the M2M device 101 is issued without unique identification and authentication data stored therein. In particular, this has the advantage that the identification module 109 does not have to be personalized before it is issued. Thus, the complex personalization with the manufacturer or vendor of the M2M device 101 or its identification module 109 or with the mobile network operator can be dispensed with. Furthermore, the identification and authentication data of the M2M device 101 does not have to be stored in the authentication server 123 before the registration of the M2M device 101 in the mobile communication network 101. Thus, resources of the authentication server 123 are saved.

The unique identification and authentication data are stored in the identification module 109 in the process of registering the M2M device 101 in the mobile communication network 107 under a valid subscription. In this process, the identification and authentication data are transmitted from the reader unit 110 to the M2M device 101 via a local communication connection between the reader unit 110 and the M2M device 101. The local communication connection is the wireless short range connection established using the communication modules 114, 119 of the reader unit 110 and the M2M device 101. In addition to the transfer of the identification and authentication data to the M2M device 101, the reader unit 110 establishes a communication connection via the mobile communication network 107 to the authentication server 123 and the authentication server 123 registers the identification and authentication data transferred to the M2M 101 under a valid subscription in the mobile communication network 107. Preferably, the subscription is derived from the subscription associated to the reader unit 110, and the authentication server 123 may determine this subscription using the identification data of the reader unit 110. Then, it may generate a new subscription associating the user of the reader unit 110 and the M2M device 101.

The identification and authentication data to be transferred to the M2M device 101 may be provided by the authentication server 123. In this case, the reader unit 110 retrieves the identification and authentication data from the authentication server 123. Upon establishing a communication connection to the authentication server 123, the reader unit 110 is identified and authenticated in the authentication server 123. Then the authentication server 123 identifies the subscription allocated to the reader unit 110 and assigns the identification and authentication data to an M2M device 101. The identification and authentication data may be generated upon receipt of the request of the reader unit 110 or the authentication server 123 may choose the identification and authentication data from pre-generated data. After having registered the M2M device 101 under the new subscription, the authentication server 123 sends the data to the reader unit 110. The reader unit 110 establishes a communication connection to the M2M device 101 and sends the identification and authentication data to the M2M device 101. In the M2M device 101, the identification and authentication data are installed in the identification module 109. After having installed the identification and authentication data, the M2M device 101 can access the mobile communication network 107 using the installed data.

As an alternative, the identification and authentication data may be provided by the reader unit 110. The reader unit 110 may generate the identification and authentication data using predefined algorithms securely stored in the reader unit 110, or the reader unit 110 chooses the identification and authentication data from a plurality of such data which have been securely stored in the reader unit 110 before. When the M2M device 101 is to be registered in the mobile communication network 107, the reader unit 110 establishes a communication connection to the authentication server 123 and sends identification and authentication data of the M2M device 101 to the authentication server 123. The authentication server 123 authenticates the reader unit 110 and determines the subscription associated with the reader unit 110. Then, the identification and authentication data received from the reader unit 110 are associated with subscription derived from this subscription. The new subscription associates the user of the reader unit 110 and the M2M device 101. Furthermore, the reader unit 110 establishes a local communication connection with the M2M device 101 and sends the same identification and authentication data to the M2M device 101. As in the embodiment described before, the received identification and authentication data are installed in the identification module 109 of the M2M device 101. Thereafter the data can by used by the M2M device 101 to access the mobile communication network 107.

Figure 3:
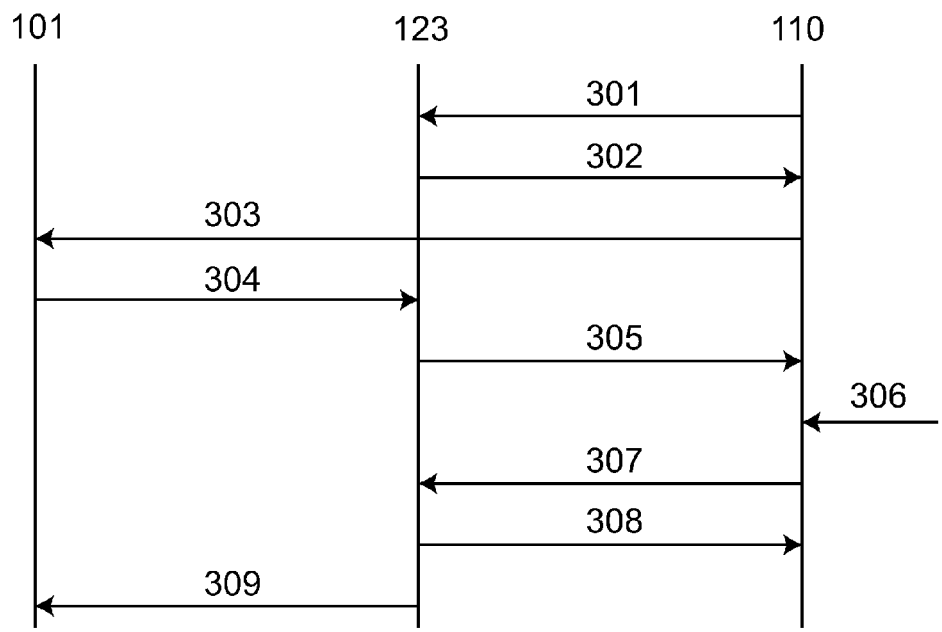
FIG. 3 is a schematic diagram showing the process of registering the M2M device in the mobile communication network, according to another exemplary embodiment of the present invention.

One implementation of the registration process in which the identification and authentication data are provided by the authentication server 123 is schematically depicted in FIG. 3. At first, the reader unit 110 accesses the mobile communication network 107 and is authenticated in the authentication server 123 in step 301. In addition, the reader unit 110 requests the authentication server 123 to transmit identification and authentication data. Thereupon, in step 302, the authentication server 123 sends the requested identification and authentication data to the reader unit 110. In addition, the authentication server 123 registers the identification and authentication data under a new subscription derived from the subscription of the reader unit 110 to the mobile communication network 107. This subscription is determined using the identification data received from the reader unit 110. After having received the identification and authentication data, the reader unit 110 establishes a local communication connection to the M2M device 101 and transmits the received identification and authentication data to the M2M device 101 in step 303. In the M2M device 101, the received identification and authentication data are installed in the identification module 109.

In the embodiment depicted in FIG. 3, an additional confirmation of the registration is provided. For this purpose, the M2M device 101 accesses the mobile communication network 107 after the identification and authentication data have been installed in the identification module 109. Then, the M2M device 101 is authenticated in the authentication server 123 using the installed identification and authentication data in step 304. Then, in step 305, the authentication server 123 notifies the reader unit 110 that the M2M device 101 has accessed the mobile communication network 107 and requests a confirmation of the registration of the M2M device 101. The request for confirmation is presented to the operator of the reader unit 110 and, in step 306, the operator may confirm that a subscription for the M2M device 101 is to be created. The operator may give the confirmation by actuating the reader unit 110 accordingly using the user interface 113 of the reader unit 110. The confirmation of the operator is send from the reader unit 110 to the authentication server 123 in step 307. Then, the authentication server 123 may mark the subscription of the M2M device 101 as confirmed. If the confirmation is not received in the authentication server 123, the subscription of the M2M device 101 may be deleted. After the authentication server 123 has marked the subscription as confirmed, it may acknowledge the subscription to the reader unit 110 in step 308 and to the M2M device 101 in step 309, thereby notifying the devices 101, 110 that the registration process has been completed successfully.

Further embodiments differ from the embodiments described before in that the M2M device does not include unique identification and authentication data for accessing communication services of the mobile communication network 107 before the registration but that it includes identification and authentication data used for identifying and authenticating the M2M device 101 in the registration process. These data may be stored in the identification module 109 of the M2M device 101. Furthermore, the data may not be uniquely assigned to the specific M2M device 101 but to a plurality of M2M devices 101, in particular to a batch of M2M devices sold together in a batch. The identification and authentication data are used to identify and authenticate the M2M device 101 in the authentication server 123 in the registration process and to verify that that the M2M device 101 is part of a trusted batch of M2M devices 101. This authentication may be done, when the M2M device 101 accesses the mobile communication network using the identification and authentication data provided by the reader unit 110 (step 304 in FIG. 3) or before. If this authentication is not successful, the registration process may be abandoned.

Furthermore, in the registration process described before, only authentication data may be securely installed in the M2M device 101, while the identification data are stored therein before, in particular when manufacturing the M2M device 101. In this embodiment, the reader unit 110 notifies the authentication server 123 of the identity of the M2M device, when requesting the registration. The identification data may also be stored in the authentication server 123 before so that a registration is done for M2M devices 101, which are already known in the authentication server 123.

In the embodiments described before, the reader unit 110 and the M2M device 101 each access the mobile communication network 107 using their respective radio modules 108, 111 in the registration process. However, it may likewise be possible that one device 101, 110 accesses the mobile communication network 107 using the radio module 108, 111 of the other device 101, 108. This radio module 108, 110 may bee accessed via the local communication connection between the devices 101, 110. In particular, the reader unit 110 may access the mobile communication network 107 using the radio module 110 of the M2M device 101. Here, data to be sent from the reader unit 110 to the mobile communication network 107 is sent via the local communication connection to the M2M device 101 and the radio module 108 of the M2M device 101. Similarly, data sent from the mobile communication network 107 to the reader unit 110 may be received in the radio module 108 of the M2M device 101 and forwarded to the reader unit 110 via the local communication connection. In this embodiment, the reader unit 110 does not need to dispose of a radio module 110.

While exemplary embodiments of the invention have been illustrated and described in detail in the drawings and foregoing description, such illustration and description are to be considered illustrative or exemplary and not restrictive; the invention is not limited to the disclosed embodiments. For example, the M2M device 101 does not have to be registered for the same user as the reader unit 110, but can also be registered under a further user which is allocated to the reader unit 110. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope.

What is claimed is:

1. A method for registering a first mobile device in a mobile communication network derived from a subscription of a second mobile device, the method comprising:
   authenticating a second mobile device in the mobile communication network upon accessing the mobile communication network;
   determining a subscription associated with the second mobile device;
   registering the first mobile device in the mobile communication network under a new subscription derived from the determined subscription of the second mobile device, such that the new subscription is different from the determined subscription, and such that the first mobile device is enabled to access the mobile communication network by means of the new subscription and the second mobile device is enabled to access the mobile communication network by means of the subscription associated with the second mobile device; and accessing the mobile communication network with the first mobile device in response to a preceding communication between the first and the second mobile device.

2. The method recited in claim 1, wherein the first and the second mobile device communicate with each other via a short range radio connection, particularly via an near field communication (NFC) connection.

3. The method recited in claim 1, wherein the second mobile device sends authentication data to the first mobile device in the communication between the first and the second mobile device, the first mobile device using the authentication data for accessing the mobile communication network.

4. The method recited in claim 3, wherein the authentication data is provided by the second mobile device and the second mobile device sends the authentication data to the mobile communication network for registration under the new subscription.

5. The method recited in claim 3, wherein the mobile communication network transmits the authentication data to the second mobile device and the second mobile device forwards the authentication data to the first mobile device in the communication between the first and the second mobile device.

6. The method recited in claim 1, wherein the mobile communication network notifies the second mobile device of a first network access of the first mobile device, further network accesses of the first mobile device are allowed only in response to a confirmation sent from the second mobile device to the mobile communication network.

7. The method recited in claim 1, wherein the first mobile device is registered under the new subscription in response to an authentication of the first mobile device in the communication network, the authentication being based on further authentication data stored in the first mobile device.

8. The method recited in claim 7, wherein in the mobile communication network authentication data are stored in association to the first mobile device, the authentication data being used to authenticate the first mobile device, when it accesses the mobile communication network.

9. The method recited in claim 7, wherein the first mobile device accesses the mobile communication network in response to the communication between the first and the second mobile device and is identified and authenticated in the mobile communication network.

10. The method recited in claim 7, wherein the mobile communication network sends to the second mobile device a feature of the first device in response to the access of the mobile communication network by the first mobile device, the first mobile device being registered in the mobile communication network only, if the mobile communication network receives a confirmation from the second mobile device as a response to transmission of the feature.

11. The method recited in claim 10, wherein the feature is a visual feature present on the first mobile device allowing a user of the second mobile device to verify the identity of the first mobile device.

12. The method recited in claim 1, wherein in the communication between the first and the second mobile device, identification data of the first device are transmitted to the second device, the second device forwarding the identification data to the mobile communication network and the mobile communication network registering the first mobile device under the new subscription upon identifying the first mobile device using the identification data.

13. The method recited in claim 1, wherein the first mobile device comprises a machine-to-machine (M2M) device that includes a control module for receiving measuring data from at least one sensor and/or for controlling at least one actuator and a radio module for accessing the device from a remote location via the mobile communication network.

14. The method recited in claim 1, wherein the first and/or the second mobile device comprise an identification module for storing the authentication data used for accessing the mobile communication network.

15. A system for registering a first mobile device in a mobile communication network derived from a subscription of a second mobile device, wherein a second mobile device can be authenticated in an authentication server of the mobile communication network, the authentication server being configured to determine a subscription associated with the second mobile device and to register the first mobile device in the mobile communication network under a new subscription derived from the determined subscription of the second mobile device, such that the new subscription is different from the determined subscription, and such that the first mobile device is enabled to access the mobile communication network by means of the new subscription and the second mobile device is enabled to access the mobile communication network by means of the subscription associated with the second mobile device, and wherein the first mobile device and the second mobile device can communicate with each other, an access of the first mobile device to the mobile communication network being allowed in response to a preceding communication between the first and the second mobile device.

16. A system for registering a first mobile device in a mobile communication network, the system comprising:
means for authenticating a second mobile device in the mobile communication network upon accessing the mobile communication network;
means for determining a subscription associated with the second mobile device;
means for registering the first mobile device in the mobile communication network under a new subscription derived from the determined subscription of the second mobile device, such the new subscription is different from the determined subscription, and such that the first mobile device is enabled to access the mobile communication network by means of the new subscription and the second mobile device is enabled to access the mobile communication network by means of the subscription associated with the second mobile device; and
means for accessing the mobile communication network with the first mobile device in response to a preceding communication between the first and the second mobile device.

* * * * *